United States Patent

Speicher et al.

(10) Patent No.: US 6,350,216 B1
(45) Date of Patent: Feb. 26, 2002

(54) METHOD OF RATIO CONTROL FOR A CVT IN A MANUAL MODE

(75) Inventors: Patrick Speicher, Oberteuringen; Armin Gierling, Langenargen, both of (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/558,278

(22) Filed: Apr. 25, 2000

(30) Foreign Application Priority Data

May 8, 1999 (DE) .......................... 199 29 693

(51) Int. Cl.$^7$ ............................................. B60R 41/12
(52) U.S. Cl. ............................. 477/37; 477/46; 474/28
(58) Field of Search ................................. 477/37, 44, 46, 477/45; 474/28, 18

(56) References Cited

U.S. PATENT DOCUMENTS

| | | | | |
|---|---|---|---|---|
| 5,609,544 A | * | 3/1997 | Lardy et al. | 477/46 |
| 5,746,678 A | * | 5/1998 | Roovers et al. | 477/45 |
| 6,033,339 A | * | 3/2000 | Aberson et al. | 477/46 |
| 6,169,950 B1 | * | 1/2001 | Parigger | 701/53 |

FOREIGN PATENT DOCUMENTS

| | | |
|---|---|---|
| DE | 41 20 540 C1 | 11/1992 |
| DE | 43 11 886 A1 | 10/1994 |
| DE | 43 12 718 A1 | 11/1994 |
| DE | 196 00 915 A1 | 7/1997 |

* cited by examiner

Primary Examiner—Charles A Marmor
Assistant Examiner—Tisha D. Lewis
(74) Attorney, Agent, or Firm—Davis & Bujold, P.L.L.C.

(57) ABSTRACT

The invention relates to a method for manual control of the ratio of a continuously variable transmission (CVT) for a vehicle. The CVT has one control device, one shifting or selector device, one starting element and one variator for ratio adjustment and is driven by an internal combustion engine. The control device processes input signals derived from a driver-vehicle system within the scope of an operating strategy under the control of the reduction ratio, the rotational speed of the prime mover, or an input rotational speed of the variator. The operation strategy automatically selects in an automatic operating mode the transmission ratio. In a manual operating mode, the driver can engage directly in the selection of the transmission ratio via the shift or selector device. It is proposed that in the operating mode there is manually preset a signal proportional to the vehicle speed which is further processed as a theoretical guidance for the operating point of the engine-transmission unit. The speed-regulating device controlled on the transmission side can be combined within the manual operating mode with the direct engagement in the selection of the transmission ratio.

9 Claims, 2 Drawing Sheets

METHOD OF RATIO CONTROL FOR A CVT IN A MANUAL MODE

BACKGROUND OF THE INVENTION

The invention concerns a method for manual control of the ratio of a continuously variable transmission (CVT).

The operating strategy of a continuously variable transmission (CVT) is usually aimed at good driveability, favorable fuel consumption and good smoothness during adjustment of the transmission ratio. Since the criteria for an operating strategy of a continuously variable transmission partly conflict, a compromise is usually made. In order to adapt the automated operating behavior of the continuously variable transmission to the driver's wishes and environmental influences, adaptive driving strategies have become known.

The Applicant's published patent application, DE-OS 196 00 915, e.g. describes a method of operating point control in an automatic operating mode in which the actual control of the operating point in a preset driving range, having a lower and an upper limit, is continuously updated by processing, without filtering, actual input signals essentially dependent on the manner of driving. Thus, the position of the operating point in the variogram of the transmission is continuously recalculated and mainly determined by the activities of the driver.

In all methods for automatic guidance of the operating point, it is disadvantageous that, in spite of elevated adaptation expenditure, not all the driver's wishes can be complied with, especially the wish for possible manual engagement.

German Patent No. DE 41 20 540 proposes to provide, together with a first operating mode having automatic driving strategy, a second operating mode in which the driver can control by manual action the operating behavior of a multi-step transmission. For this purpose, a number of preset, constant ratios or ratio steps are stored, e.g. in a characteristic field. If the driver issues a manual shift command to the transmission, the constant transmission ratios are selected from the characteristic field depending on a driving conditions.

The production of a multi-step transmission with constant ratios and a manual operating strategy for a continuously variable transmission makes it possible for the driver, when preferred, to use performance-oriented engagement to select the transmission ratio.

SUMMARY OF THE INVENTION

The present invention is based on the problem of providing control of the ratio of a continuously variable transmission having an automatic operating mode and a second manual operating mode in which the operating behavior is improved in the manual operating mode in which the driver has direct control of the selection of the ratios.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE PREFERRED EMBODIMENTS

According to the invention, it is proposed to operate the variator in the second manual operating mode via speed regulation, output rotational speed regulation or an initial rotational speed regulation of the variator.

Figure 1:
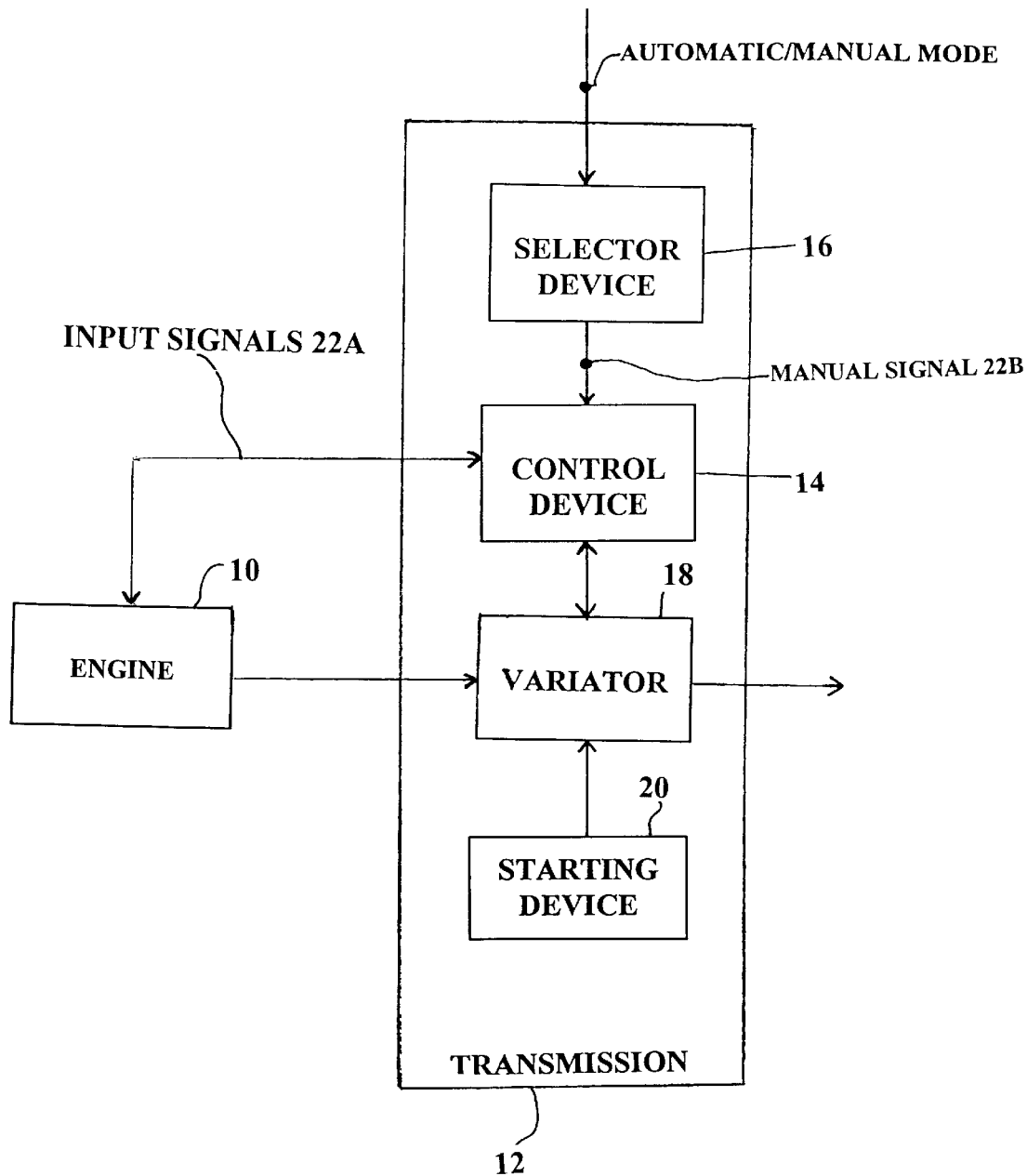
FIG. 1 is a block diagram of an exemplary engine-transmission system incorporating the present invention; and, FIG. 2 is a variogam illustrating operation of the present invention for controlling variator output speed according to a manual signal equivalent to vehicle speed.
Figure 2:
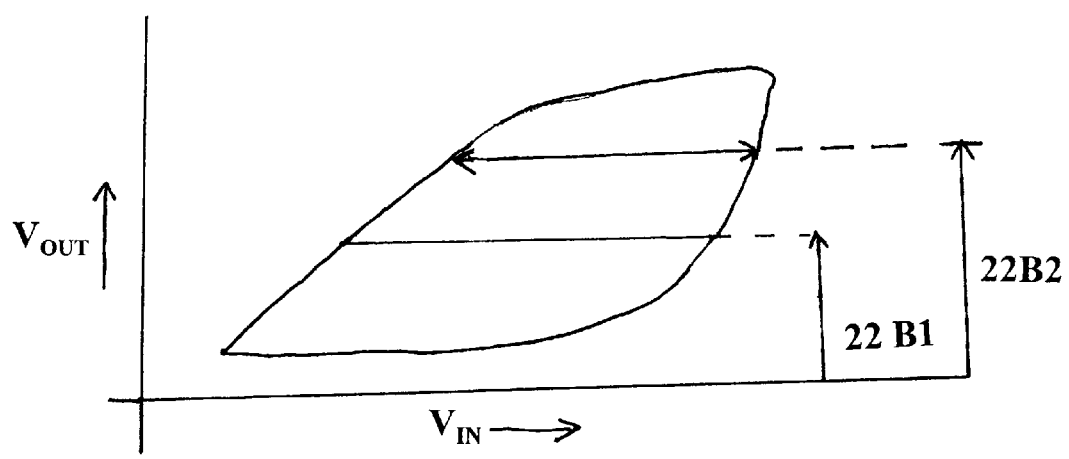

The method of the present invention for manual guidance of a ratio of a continuously variable transmission of a motor vehicle, including one driven by an internal combustion engine, is illustrated in FIGS. 1 and 2. As illustrated in FIG. 1, the in vehicle includes an engine 10 and a transmission 12 which is provided with a control device 14, a selector device 16, a starting device 18 and a variator 18 for ratio adjustment. When the control device 14 is in an automatic operating mode, the control device 14 automatically selects and adjusts the transmission ratio of the variator 18 according to input signals 22 drawn from a driver-vehicle system. When the control device 14 is in a manual operating mode, the driver may directly change one of, for example, the vehicle speed, output torque or acceleration, wherein in the manual operating mode a manual signal 22B equivalent to the one of vehicle speed, output torque and acceleration is preset by the driver as a theoretical guidance of the engine-transmission unit.

With a changeover from an automatic operating mode to a manual operating mode, vehicle speed is determined by the driver and is maintained constant up to the next manual engagement. This operation is illustrated in the variogram of FIG. 2 for the example of vehicle speed wherein it is shown that a change in the manual signal 22B equivalent to vehicle speed from a first manual signal value 22B1 to a second manual signal value 22B2 results in a change in vehicle speed, $V_{out}$, but that vehicle speed $V_{out}$ is constant until or unless there is a change in manual signal 22B. For this purpose, and as illustrated in the example, the control unit 14 of the transmission 12 controls the variator 18 ratio to maintain a constant Out when in manual mode until and unless there is a driver directed change in manual signal 22B. The control unit 14 of the transmission, likewise, presets the operating points of the prime mover, particularly engine rotational speed and engine torque, the signal transmission from the transmission control unit to the engine control unit usually being passed via a data bus system. In the same manner, the transmission control unit can control the vehicle brake, e.g. in downhill drive.

According to the invention, a manual shift command of the driver to the manual operating mode is interpreted as an instruction by the driver for a speed change. The manual guidance of the signal 22B equivalent to the vehicle speed via the control 14 or selector device 16 can be both continuous and in incremental or decremental steps.

Accordingly to the new manual guidance, the transmission control will convert the speed change via a variator adjustment and/or a correction of the engine operating point and/or a brake engagement. The speed-oriented operating point guidance preferably originates from a method described in DE-OS 196 00 915, i.e. from a free position of the actual operating point within a driving range determined by an upper and a lower limit.

Since the inventive method for manual ratio guidance is comfort oriented for smoothness similarly to an engine speed-regulating device, the operating point guidance takes place with moderate adjustment gradient and, in particular, at the lowest possible engine rotational speed level.

The shifting or selector device is preferably designed as a tip switch on the steering wheel of the vehicle, e.g. as shifting lever on a steering wheel spoke.

The inventive method combines the advantages manual control by the driver of the operating point guidance of the engine-transmission unit as a speed-regulating drive in the manual operating mode with the comfort and safety of a continuously variable ratio adjustment in the automatic operating mode.

Other advantages are the easy operation of the speed-regulating device in the transmission and an advantage of cost for the client by elimination of an additional control unit on the engine ("GRA", "cruise control").

In another development, it is proposed according to the invention that instead of the speed-equivalent signal, an acceleration signal or an output-torque equivalent signal be issued as a manual driver's desire. When passing from the automatic operating mode to the manual operating mode, the actual position of the operating point is determined and kept constant chiefly according to the speed. A subsequent manual shift command of the driver, via the shifting or selector device, is evaluated accordingly as the driver's acceleration desire and converted by the transmission control unit through actions on the transmission and engine side.

As a convenient development, it is proposed continuously to manipulate the driver's manual engagement, e.g. by a continuous acceleration increase, while a key of the shifting or selector device is actuated by the driver.

In another development of the invention, it is proposed that in the manual operating mode of the continuously variable transmission the driver be able, via an additional control device, to select whether he is going manually to engage in the transmission ratio or whether he is going to manually preset the speed of the vehicle. The shifting device for the manual engagements, preferably placed on the steering wheel, is advantageously used for two functions: in one it can control with the same shifting unit the regulating device for the driving speed of the transmission and in the other a manual gear selection such as proposed in German Patent No. DE 41 20 540 is hit upon.

The additional control device with which the operation of the shifting or selector device within the manual operating mode can be alternated between manual speed regulation and manual engagement in the gear selection, is spatially disposed in the vehicle so as to rule out inadvertent actuation by the driver. The control device is preferably situated in the instruments area, i.e. spatially separated from a shifting device and a selector drive, in the central console.

The essential advantage of said embodiment of the invention in comparison with the known manual reproduction is an enlarged scope of use of the manual driver engagement in the operation strategy of the continuously variable transmission.

For this, it is proposed in an inventive development to include in the manual operating mode a shifting device of a speed-regulating system ("GRA," "cruise control") available on the vehicle and usually situated in the steering wheel area. Via the same shifting device, the driver conveniently can manually control in the operating strategy of the vehicle or in the selection of the transmission ratio via the known functionality of the speed-regulating system on the engine or the vehicle, or directly, e.g. by stepped shifts according to German Patent No. DE 41 20 540.

In one other embodiment of the invention, it is proposed that on the basis of superimposed input signals the manual operating mode of the continuously variable transmission is immediately abandoned in favor of the automatic operating mode and changed back to the manual operating mode immediately after termination of the superimposed input signals. The changes occur unnoticed by the driver. For example, superimposed signals are a kick-down shift command (KD) of the driver or an information of the antiblock system "ABS active". Important special functions effective in the automatic operating mode of the CVT can thus be easily used also in the manul operating mode.

What is claimed is:

1. A method for manual guidance of a ratio of a continuously variable transmission of a motor vehicle, including one driven by an internal combustion engine, which transmission is provided with a control device, a selector device, a starting device and a variator for ratio adjustment, wherein said control device, in an automatic operating mode, automatically selects and adjusts the transmission ratio according to input signals drawn from a driver-vehicle system and, in a manual operating mode, allows the driver to directly change one of vehicle speed, output torque and acceleration, wherein in the manual operating mode a manual signal equivalent to the one of vehicle speed, output torque and acceleration is preset by the driver as a theoretical guidance of the engine-transmission unit.

2. The method according to claim 1, wherein the change of the manual signal equivalent to the one of vehicle speed, output torque and acceleration is continuously preset by the driver.

3. The method according to claim 1, wherein the change of the manual signal equivalent to the one of vehicle speed, output torque and acceleration is preset by the driver in increments and/or decrements.

4. The method according to claim 1, wherein the change of the manual signal equivalent to the one of vehicle speed, output torque and acceleration is preset relative to the one of actual vehicle speed, output torque and acceleration.

5. The method according to claim 1, wherein in the manual operating mode it is further possible to alternate via the control device between the manual guidance by the manual signal equivalent to the one of vehicle speed, output torque and acceleration and a manual guidance for directly influencing the transmission ratio.

6. The method according to claim 5, wherein in the vehicle the control device is spatially separated from the shifting or selector device for manual engagement.

7. The method according to claim 5, wherein the manual guidance of a signal equivalent to the one of vehicle speed, output torque and acceleration and the manual guidance for directly influencing the transmission ratio are effected with the same shifting or selector device.

8. The method according to claim 5, wherein the driver controls the manual guidance for directly influencing the transmission ratio via the control device of a speed-regulation device of at least one of the engine and vehicle.

9. The method according to claim 1, wherein the manual operating mode is immediately abandoned in the presence of superimposed input signals, changing to the first automatic operating mode and immediately changing back to the manual operating mode after extinction of the superimposed input signal.

* * * * *